(12) United States Patent  (10) Patent No.: US 12,283,008 B2
Bitan et al.  (45) Date of Patent: Apr. 22, 2025

(54) SYSTEMS AND METHODS FOR PARAMETRIC CAPTURE OF LIVE-STREAMING EVENTS

(71) Applicant: AR51 Ltd., Tel-Aviv (IL)

(72) Inventors: Moshe Bitan, Givat Shmuel (IL); Lior Kirsch, Ramat Gan (IL); Tom Rosenfeld, Rishon LeTsiyon (IL)

(73) Assignee: AR51 Ltd., Tel-Aviv (IL)

( * ) Notice: Subject to any disclaimer, the term of this patent is extended or adjusted under 35 U.S.C. 154(b) by 356 days.

(21) Appl. No.: 18/150,241

(22) Filed: Jan. 5, 2023

(65) Prior Publication Data

US 2023/0215119 A1  Jul. 6, 2023

Related U.S. Application Data

(60) Provisional application No. 63/296,856, filed on Jan. 6, 2022.

(51) Int. Cl.
| | |
|---|---|
| *G06T 19/00* | (2011.01) |
| *G06T 11/00* | (2006.01) |
| *G06T 15/20* | (2011.01) |
| *G06V 20/20* | (2022.01) |

(52) U.S. Cl.
CPC .......... *G06T 19/006* (2013.01); *G06T 11/001* (2013.01); *G06T 15/20* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 2020/0035019 A1* | 1/2020 | Cappello | G06T 7/536 |
| 2020/0151881 A1* | 5/2020 | Dodd | G06T 7/11 |
| 2022/0180594 A1* | 6/2022 | Guan | G06T 7/0002 |

* cited by examiner

*Primary Examiner* — Tapas Mazumder
(74) *Attorney, Agent, or Firm* — The IP Law Firm of Guy Levi, LLC

(57) ABSTRACT

Embodiments of the present disclosure may include a method for parametric capture of an event including capturing discrete elements. In some embodiments, the discrete elements may include at least one participant, a three dimensional object, and an environmental aspect of the event. Embodiments may also include filming a live event to create image data from a scene. In some embodiments, a frame of the image data from the scene may include a discrete element. In some embodiments, the discrete element includes at least one of the three dimensional object, at least one participant, or the environmental aspect of the event. Embodiments may also include receiving the image data of the scene. Embodiments may also include identifying at least one discrete element within the image data from the scene. In some embodiments, the discrete elements may be associated with one or more characteristics.

20 Claims, 7 Drawing Sheets

SYSTEMS AND METHODS FOR PARAMETRIC CAPTURE OF LIVE-STREAMING EVENTS

PRIORITY CLAIM

This application claims priority as a continuation of U.S. provisional patent application Ser. No. 63/296,856, titled SYSTEMS AND METHODS FOR PARAMETRIC CAPTURE OF LIVE-STREAMING EVENTS, filed Jan. 6, 2022, the contents of which are incorporated in their entirety by this reference.

TECHNICAL FIELD

The present invention generally relates to systems and methods for parametric capture of live-streaming events.

BRIEF SUMMARY

Embodiments of the present disclosure may include a method for parametric capture of an event including capturing discrete elements. In some embodiments, the discrete elements may include at least one participant, a three dimensional object, and an environmental aspect of the event. Embodiments may also include filming a live event to create image data from a scene. In some embodiments, a frame of the image data from the scene may include a discrete element. In some embodiments, the discrete element includes at least one of the three dimensional object, at least one participant, or the environmental aspect of the event. Embodiments may also include receiving the image data of the scene. Embodiments may also include identifying at least one discrete element within the image data from the scene. In some embodiments, the discrete element is associated with one or more characteristics. Embodiments may also include assigning one or more parameters to the one or more characteristics. In some embodiments, the discrete element, the one or more characteristics, and the one or more parameters constitute scene information data. Embodiments may also include triangulating the scene information data to construct a three dimensional representation of each discrete element within the image data from the scene. Embodiments may also include processing the image data from the scene to construct a two dimensional surface representation for each discrete element within the image data from the scene. Embodiments may also include integrating the three dimensional representation and the two dimensional representation for each discrete element. Embodiments may also include rendering an image of the scene based on integrated three dimensional and two dimensional representations for each discrete element within the image data from the scene.

In some embodiments, the live event may include a live stream event, a sports event, a concert, a lecture, a one-to-one training, or a one to many training, a holographic communication, an augmented reality event, or a virtual reality event. In some embodiments, the capturing may also include pre-recording the discrete elements prior to the live event. Embodiments may also include sending the rendered image of the scene to a consumer electronic device. In some embodiments, the consumer electronic device is an Extended Reality (XR) device, a mobile phone, a projection device, a monitor, a heads up display, an optical head-mounted display, or a television. In some embodiments, the Extended Reality (XR) device is an Augmented Reality (AR) device, a Virtual Reality (VR) device, or a Mixed Reality (MR) device.

Embodiments of the present disclosure may also include a method for performing parametric capturing and streaming of a scene over time, the method including receiving image data of a scene. Embodiments may also include identifying a discrete element within the image data from the scene. In some embodiments, the discrete element is associated with one or more characteristics. Embodiments may also include assigning one or more parameters to the one or more characteristics. In some embodiments, the discrete element, the one or more characteristics, and the one or more parameters constitute scene information data. Embodiments may also include triangulating the scene information data to construct a three dimensional representation of each discrete element within the image data from the scene. Embodiments may also include processing the image data from the scene to construct a two dimensional surface representation for each discrete element within the image data from the scene. Embodiments may also include integrating the three dimensional representation and the two dimensional representation for each discrete element. Embodiments may also include rendering an image of the scene based on integrated three dimensional and two dimensional representations for each discrete element within the image data from the scene.

In some embodiments, the receiving image data of a scene may include receiving recorded video data of a scene. In some embodiments, the receiving image data of a scene may include receiving real-time streaming video data of a scene. In some embodiments, the receiving image data of a scene may include receiving image data from a plurality of cameras capturing the scene. In some embodiments, the receiving image data from a scene may include receiving image data from a plurality of cameras. In some embodiments, each camera has a different view of the scene.

In some embodiments, the scene may include a performance event including one or more of a sporting event, a promotional event, or a cultural event. In some embodiments, the discrete element includes at least one three dimensional object present in the scene. In some embodiments, the at least one three dimensional object present in the scene may include one or more of a sporting equipment article, an item of event equipment, a scene participant, an environmental element, or a scene member.

In some embodiments, the sporting equipment article may include at least one of a sporting glove, a ball, a net, a piece of equipment, a consumer electronic, or an item of clothing, In some embodiments, the item of event equipment may include at least one of a musical instrument or a scene prop. In some embodiments, the scene participant may include at least one of a player, a judge, a referee, an actor, or a commentator.

In some embodiments, the environmental element may include at least one of a natural feature, an architectural feature, a structural feature, a seat, or an advertisement. In some embodiments, the scene member may include an audience member. In some embodiments, the one or more characteristics may include at least one of light reflective property data, movement data, object deformation data, body posture data, facial expression data, color data, normal data, tangent data, depth data, or resolution data.

In some embodiments, the one or more parameters may include a motion feature. In some embodiments, the rendering may also include rendering at least one of a cloth deformation, a hair movement, or a lighting aspect. In some embodiments, the lighting aspect may include a specular lighting aspect, a diffuse lighting aspect, an ambient lighting aspect, a global illumination lighting aspect, a representation of an artificial light source, a representation of a man-made light source, or a representation of a natural light source.

In some embodiments, the assigning of the one or more parameters to the one or more characteristics may include, assigning three dimensional coordinates to an object in the scene to estimate a spatial position of the object in the scene. In some embodiments, the assigning of the one or more parameters to the one or more characteristics may include, assigning one or more parameters to an object in the scene as a way to locate the object in a subsequent image frame.

In some embodiments, the one or more parameters may include, a designation of object type and a plurality of parameters that specify a location and an orientation of a discrete element. In some embodiments, the one or more parameters may include, at least one of shape, a scale, a sheer, color, texture, position in space, orientation in space, directional velocity, or rotational velocity. In some embodiments, the one or more parameters may include, at least one of body posture, body position, body orientation, body proportion, individual identity, muscle deformation, facial expression, facial color, facial texture, finger posture, or hand posture.

In some embodiments, the one or more parameters may include at least one of 2D position or 3D position. In some embodiments, the one or more parameters is determined using a supervised learning algorithm, a deep neural network, or a machine learning algorithm. In some embodiments, the triangulating the scene information data to construct a three dimensional representation of each discrete element within the image data from the scene may include, constructing a spatial and temporal coherent parametric representation of the scene based on 2D and 3D parameters assigned to one or more characteristics of one or more discrete elements.

In some embodiments, the spatial and temporal coherent parametric representation of the scene is further based on color and texture data for each of the discrete elements. In some embodiments, the spatial and temporal coherent parametric representation of the scene is further based on raw image data from the scene. In some embodiments, the processing of the image data from the scene to construct a two dimensional surface representation for each discrete element within the image data from the scene may include, processing texture data from a time series of images to construct a two dimensional surface representation for each discrete element within the image data from the scene.

In some embodiments, the processing of the image data from the scene to construct a two dimensional surface representation for each discrete element within the image data from the scene may include, constructing a two dimensional surface representation for a discrete element based on the image data, image data from previous time points, and prior knowledge of one or more characteristics of the discrete element.

In some embodiments, the rendering of an image of the scene based on integrated three dimensional and two dimensional representations for each discrete element within the image data from the scene may include, designating a portion of the data for omission from rendering based on a viewing angle or perspective view. In some embodiments, the rendering of an image of the scene based on integrated three dimensional and two dimensional representations for each discrete element within the image data from the scene may include, performing one or more 3D manipulations on the integrated three dimensional and two dimensional representations for each discrete element using at least one of a physics simulation algorithm or an anatomically correct body deformation algorithm.

In some embodiments, the rendering of an image of the scene based on integrated three dimensional and two dimensional representations for each discrete element within the image data from the scene may include, transferring a rendered image of the scene to a supervised learning algorithm. In some embodiments, the supervised learning algorithm re-renders the rendered image into a photorealistic image. In some embodiments, the supervised learning algorithm may include at least one of a Deep Neural Network (DNN), a Convolutional Neural Network (CNN), or a Generative Adversarial Network (GAN).

In some embodiments, the rendering of an image of the scene based on integrated three dimensional and two dimensional representations for each discrete element within the image data from the scene may include, applying an unsupervised artificial intelligence algorithm to one or more rendered images. In some embodiments, the unsupervised artificial intelligence algorithm refines the one or more rendered images.

BRIEF DESCRIPTION OF THE DRAWINGS

For the purposes of illustrating the present invention, there is shown in the drawings a form which is presently preferred, it being understood however, that the invention is not limited to the precise form shown by the drawings in which.

DETAILED DESCRIPTION

The present invention relates generally to the parametric capture of live streaming events. Parametric capture is applicable to a number of applications including, but not limited to, real-time sports broadcasting in Augmented Reality (AR), Mocap (motion capture) for XR, and Mocap for Animation. For broadcast events, such as live events, the present invention is useful for capturing image data, such as people and objects, via standard motion capture devices, like cameras, and provide a representation and or presentation of these people and objects in 3D space. These representations and the presentation of image data may occur on networked devices such as an XR device Live streaming of events over electronic devices such as televisions, mobile phones, computers, and laptops is common, and various technologies are available in the market for consuming media on these different viewer screens. However, with the advancements in technologies such as Extended Reality (XR) device including an Augmented Reality (AR) device, a Virtual Reality (VR) device, a Mixed Reality (MR) device, and the likes, simply streaming of live events no longer offers media broadcasters and Over The Top providers like NetFlix, Roku, and Tivo a competitive advantage. Real-time event broadcasting AR, Mocap for XR, and Mocap for Animation, and the likes involving the XR devices, AR devices, and VR devices benefits from computer animation which can be recorded in advance. A lack of three-dimension-ready content could be limiting adoption of these technologies. Multiple cameras deployed for parametric capture of live events from various angles and positions in the spirit of the present invention will provide for more compelling media on these devices. Parametric capture of people and objects may occur via standard motion capture devices, like cameras and video recorders. The process of parametric capture can provide a representation, characteristics, attributes, and or presentation of people and objects in 3D space for use in a live stream or for future streaming events. Techniques of parametric capture consistent with the present invention demonstrate enhanced streaming performance for extended reality devices.

Figure 1:
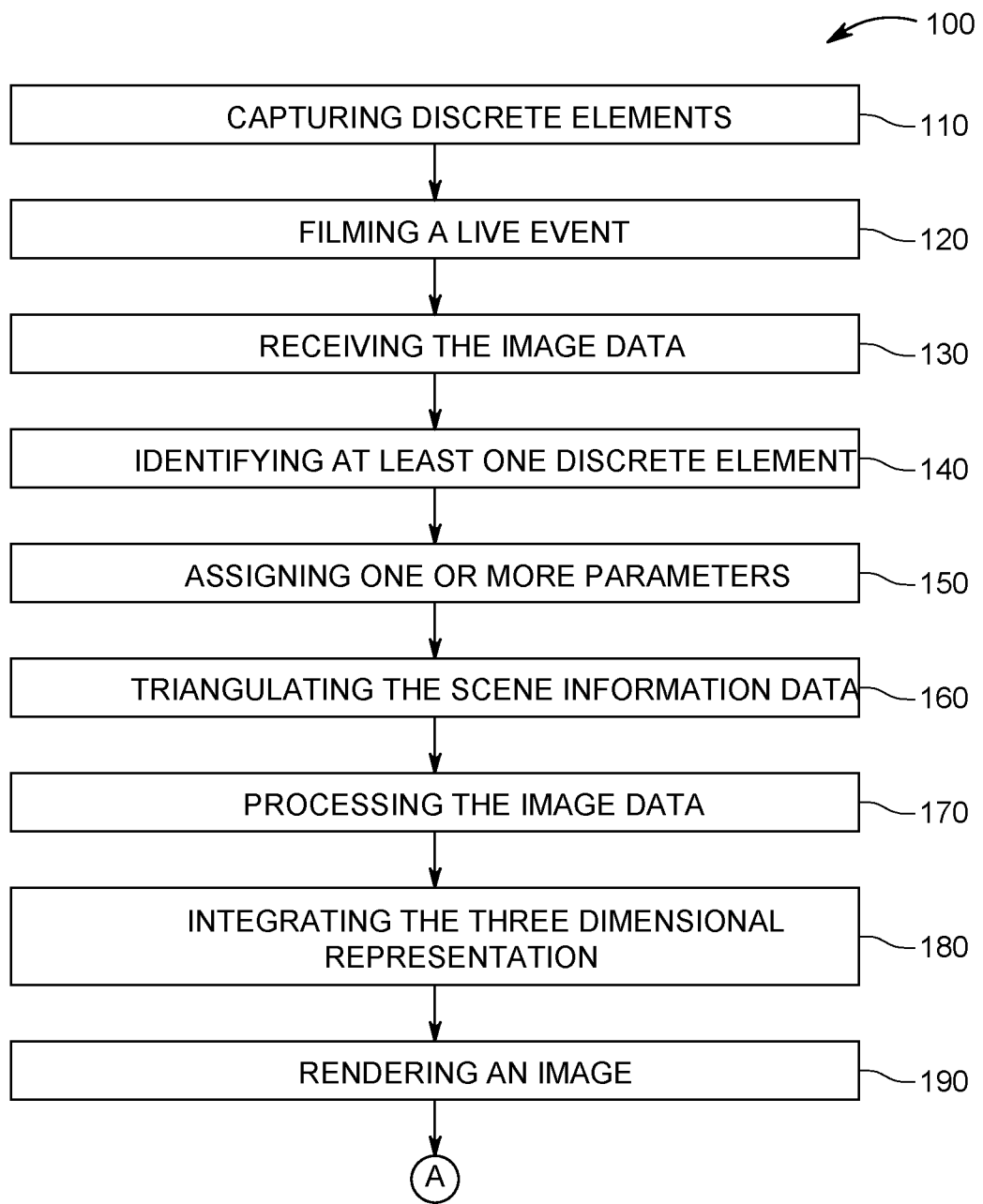
FIG. 1 depicts a high-level logic flow of a parametric capture process of a live event.

FIG. 1 shows an exemplary method according to some embodiments of the present disclosure. According to FIG. 1, embodiments may include a method for parametric capture of an event including 110 to 190. In such an embodiment, it may be desirable to capture aspects of a planned live event prior to the event, sometimes referred to as pre-production. Such an event may include, for example, a sporting event such as a basketball game. At 110, the method may include capturing discrete elements. With regard to a broadcasted basketball event, the discrete elements may include at least one participant such as a basketball player, a three dimensional object such as a basketball, and an environmental aspect of the event such as the basketball court. At 120, the method may include filming a live event to create image data from a scene. Filming may generally be accomplished with one or more video cameras optimally positioned to capture a live event. In some embodiments, the number of cameras, their image, and sound quality captured Frames Per Second (FPS), and image resolution can be modified to match the quality of pre-captured discrete elements or may be optimized for a broadcast-quality or a broadcast bandwidth requirement.

In embodiments in which multiple cameras are used, for example, multiple cameras positioned about a court, a calibration process may first be performed on one or more of the multiple cameras. Once a live event begins, a video broadcast from one or all cameras may be sent to the cloud. Once on the cloud, the recorded video image data may be processed on servers that run discrete element recognition algorithms.

In some embodiments, a frame, such as a single frame from a motion capture device of the image data from the scene includes a discrete element. In some embodiments, the discrete element includes at least one of the three dimensional object, at least one participant, or the environmental aspect of the event. As may occur in a live event, motion capture devices positioned about the event may include different image data. For example, from a first perspective, image data may include a basketball player, a basketball, a portion of the basketball court, and a basket. An alternative angle may include all ten basketball players, a referee, the length of the basketball court, while the view of the basketball may be obstructed by at least one player.

At 130, the method may include receiving the image data of the scene. The image data may be received locally at a broadcast booth or on-premise server. It will be appreciated by one having ordinary skill in the art that the image data of the scene may alternatively be sent off-premises. For example, an off-premises location may include a cloud service or a live stream direct to a viewer's personal viewing device, such as a consumer electronic device.

At 140, the method may include identifying at least one discrete element within the image data from the scene. The algorithms' final output may be the live event data stored in memory in a proprietary format. In such an embodiment, the format may contain the relevant game data. In some embodiments, the discrete elements may be associated with one or more characteristics.

At 150, the method may include assigning one or more parameters to the one or more characteristics. In some embodiments, the discrete element, the one or more characteristics, and the one or more parameters constitute scene information data. Use a set of multiple algorithms to extract 3D data of discrete elements such as the people and objects that appear in the image data of live video capture. The use of multiple algorithms to extract 3D data of discrete elements can be done either in real-time or in an offline manner (this is configured per project/product). In the case of basketball relevant game data, for example, the people on the court, the ball and baskets, and their location in 3D and/or 4D space is stored. The data from the 3D or 4D proprietary format may later or contemporaneously be streamed to interested end-users (consumers) who can watch the game on an XR device in 3D space. Once the 3D data has been extracted, a completed project may persist the 3D data, for example in a proprietary format for later use. In another non-limiting example, a completed project may send the 3D data in real-time to be displayed on an XR device (e.g. mobile phone, Oculus Quest, HoloLens2).

At 160, the method may include triangulating the scene information data to construct a three dimensional representation of each discrete element within the image data from the scene. At 170, the method may include processing the image data from the scene to construct a two dimensional surface representation for each discrete element within the image data from the scene. At 180, the method may include integrating the three dimensional representation and the two dimensional representation for each discrete element. At 190, the method may include rendering an image of the scene based on integrated three dimensional and two dimensional representations for each discrete element within the image data from the scene.

Figure 2:
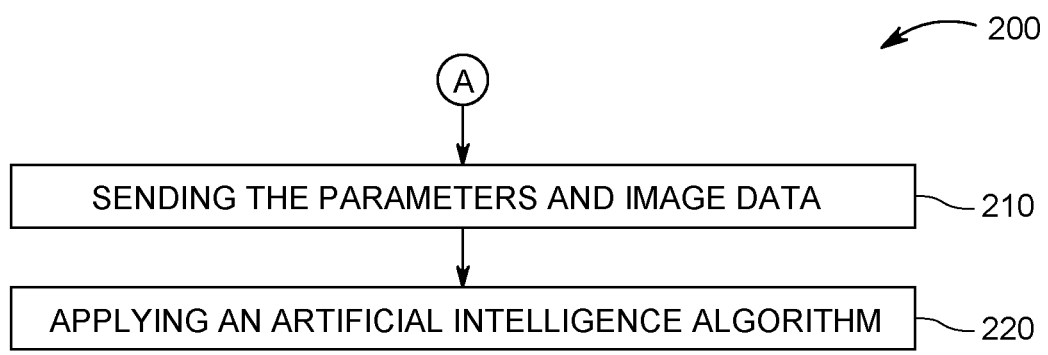
FIG. 2 depicts variants of the flow of FIG. 1 including processing image data from a scene.

FIG. 2 shows another exemplary method according to some embodiments of the present disclosure. In some embodiments, the method may include one or more steps in addition to 110 to 190 described in FIG. 1. At 210, the method may include sending the one or more parameters and image data of the scene to a consumer electronic device. At 220, the method may include applying an artificial intelligence algorithm to one or more rendered images. In some embodiments, the artificial intelligence algorithm refines the one or more rendered images.

Figure 3:
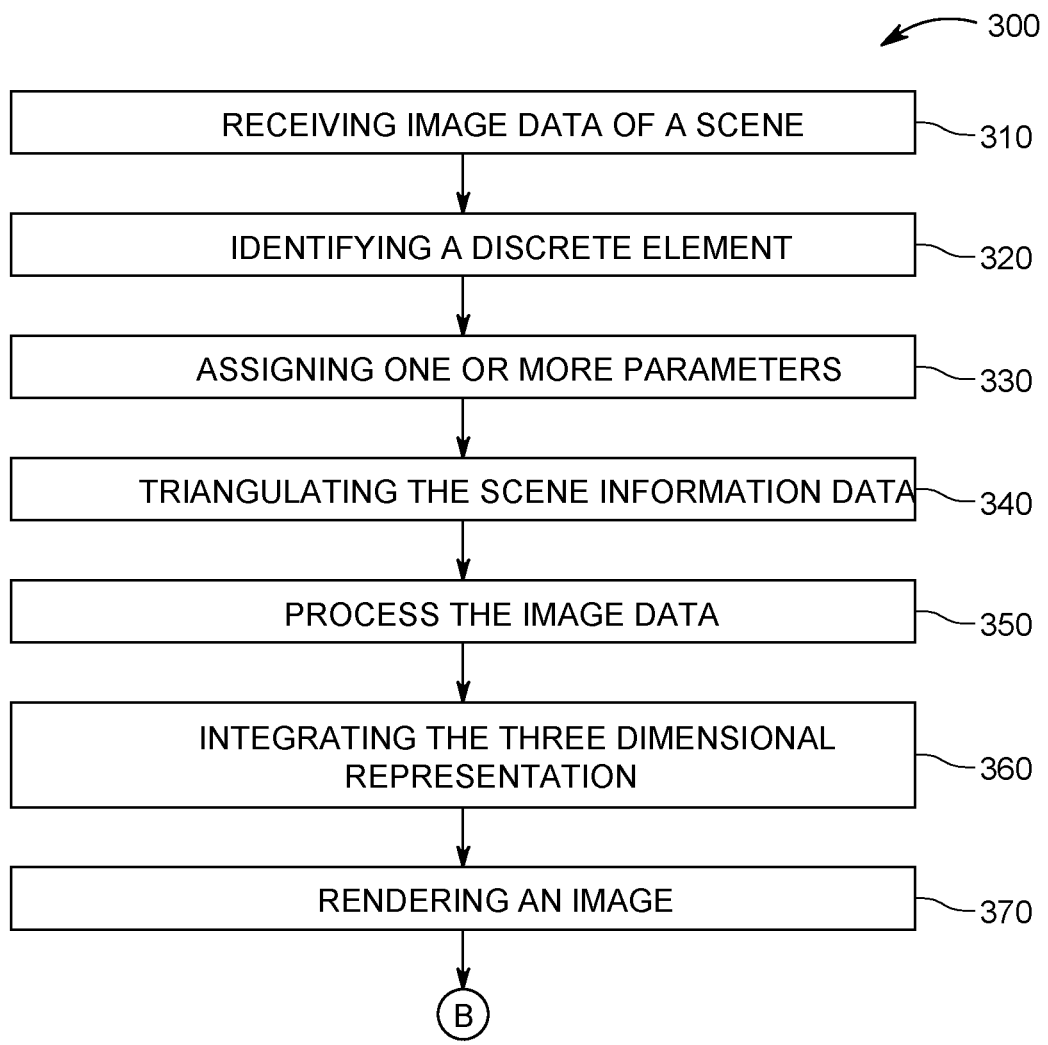
FIG. 3 depicts an alternative to the flow of FIG. 1 in which discrete elements from a live event have been pre-recorded

FIG. 3 shows an exemplary method according to some embodiments of the present disclosure. According to FIG. 3, embodiments may include a method for performing parametric capturing and streaming of a scene over time, the method including 310 to 370. At 310, the method may include receiving image data of a scene. At 320, the method may include identifying a discrete element within the image data from the scene. In some embodiments, the discrete elements may be associated with one or more characteristics. At 330, the method may include assigning one or more parameters to the one or more characteristics. In some embodiments, the discrete element, the one or more characteristics, and the one or more parameters constitute scene information data.

At 340, the method may include triangulating the scene information data to construct a three dimensional representation of each discrete element within the image data from the scene. At 350, the method may include processing the image data from the scene to construct a two dimensional surface representation for each discrete element within the image data from the scene. At 360, the method may include integrating the three dimensional representation and the two dimensional representation for each discrete element. At 370, the method may include rendering an image of the scene based on integrated three dimensional and two dimensional representations for each discrete element within the image data from the scene.

Figure 4A:
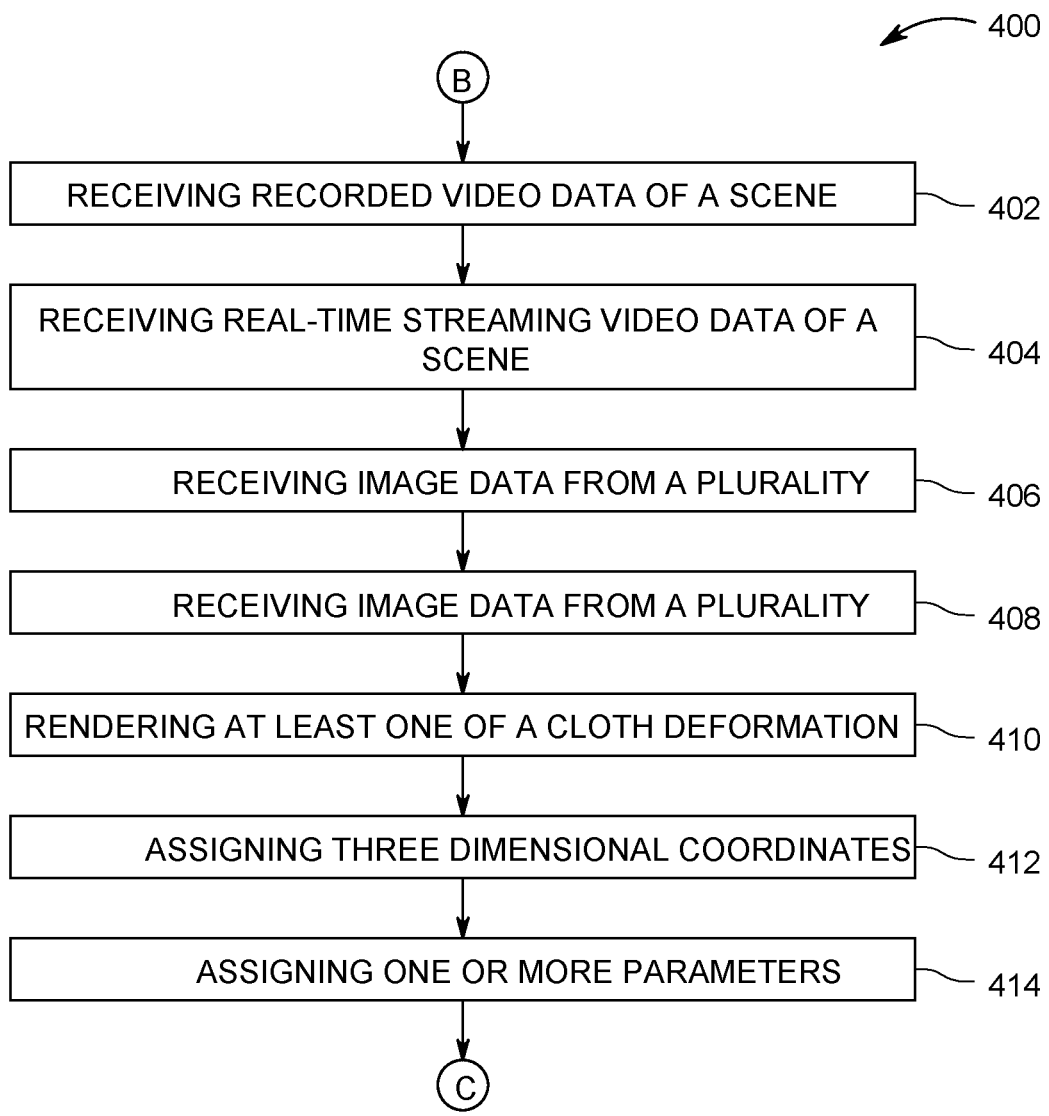
FIG. 4A depicts variants of the flow of FIG. 3.
Figure 4B:
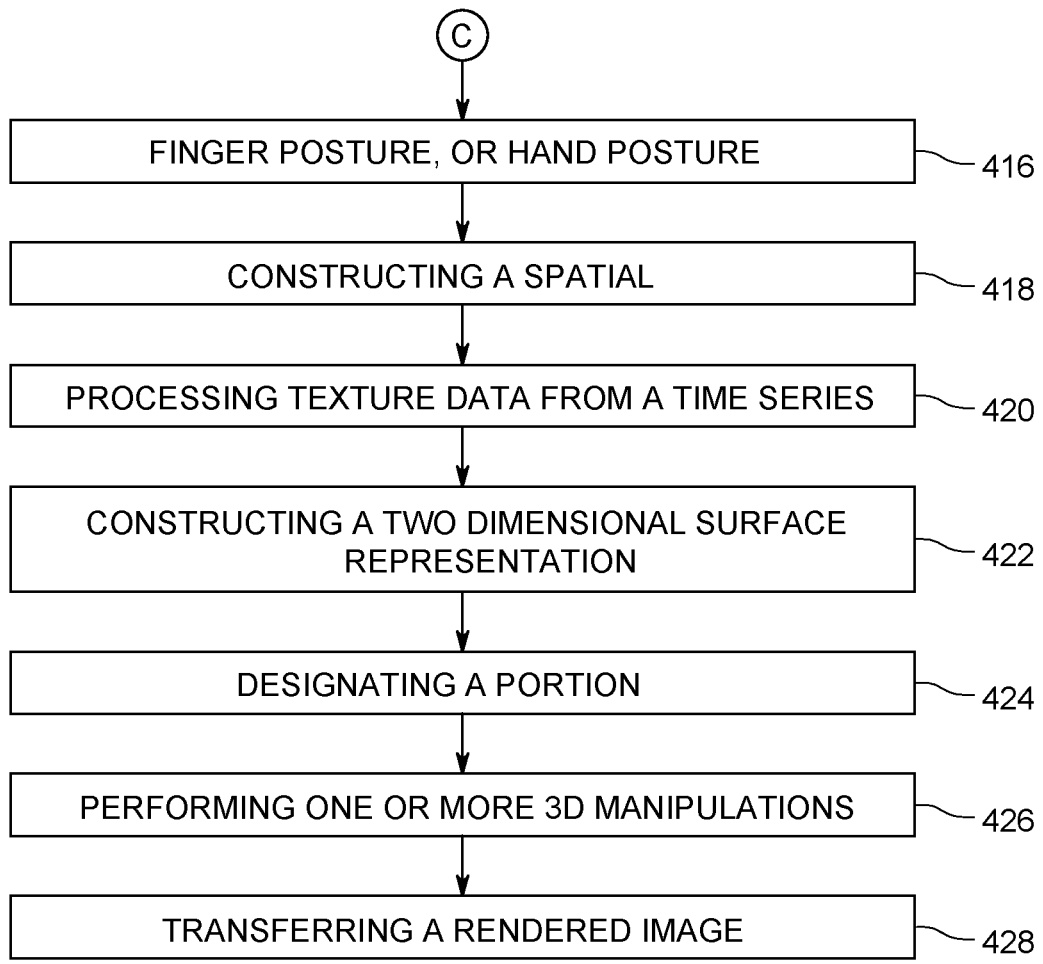
FIG. 4B depicts further variants of the flow of FIG. 3.

FIG. 4 shows another exemplary method according to some embodiments of the present disclosure. In some embodiments, the method may include one or more steps in addition to 310 to 370 described in FIG. 3. At 402, the method may include receiving recorded video data of a scene. At 404, the method may include receiving real-time streaming video data of a scene.

At 406, the method may include receiving image data from a plurality of cameras capturing the scene. At 408, the method may include receiving image data from a plurality of cameras. In some embodiments, each camera has a different view of the scene. At 410, the method may include rendering at least one of a cloth deformation, a hair movement, or a lighting aspect. At 412, the method may include assigning three dimensional coordinates to an object in the scene to estimate the spatial position of the object in the scene.

At 414, the method may include assigning one or more parameters to an object in the scene as a way to locate the object in a subsequent image frame. At 416, the method may include finger posture or hand posture. At 418, the method may include constructing a spatial and temporal coherent parametric representation of the scene based on 2D and 3D parameters assigned to one or more characteristics of one or more discrete elements. At 420, the method may include processing texture data from a time series of images to construct a two dimensional surface representation for each discrete element within the image data from the scene.

At 422, the method may include constructing a two dimensional surface representation for a discrete element based on the image data, image data from previous time points, and prior knowledge of one or more characteristics of the discrete element. At 424, the method may include designating a portion of the data for omission from rendering based on a viewing angle or perspective view. At 426, the method may include performing one or more 3D manipulations on the integrated three dimensional and two dimensional representations for each discrete element using at least one of a physics simulation algorithm or an anatomically correct body deformation algorithm. At 428, the method may include transferring a rendered image of the scene to a supervised learning algorithm. In some embodiments, the supervised learning algorithm re-renders the rendered image into a photorealistic image.

The outputs of steps in FIGS. 1 to 4B are useful for live events and often include at least one of a discrete element, object characteristics, one or more parameters, rendered images, photorealistic images. This information can be associated with the live event, may be generated by the server at the cloud, may be sent to the client for more pipeline and algorithm processing.

Further, the various steps involved in the pipeline or algorithms to be executed by the server on the cloud. Such pipeline or algorithms may be distributed between the off-premise server, the cloud, and the client as required by the application. In some embodiments, the algorithms may be executed by the off-premise server, and other algorithms may be executed on the cloud and/or by the client where the media will be consumed.

Figure 5:
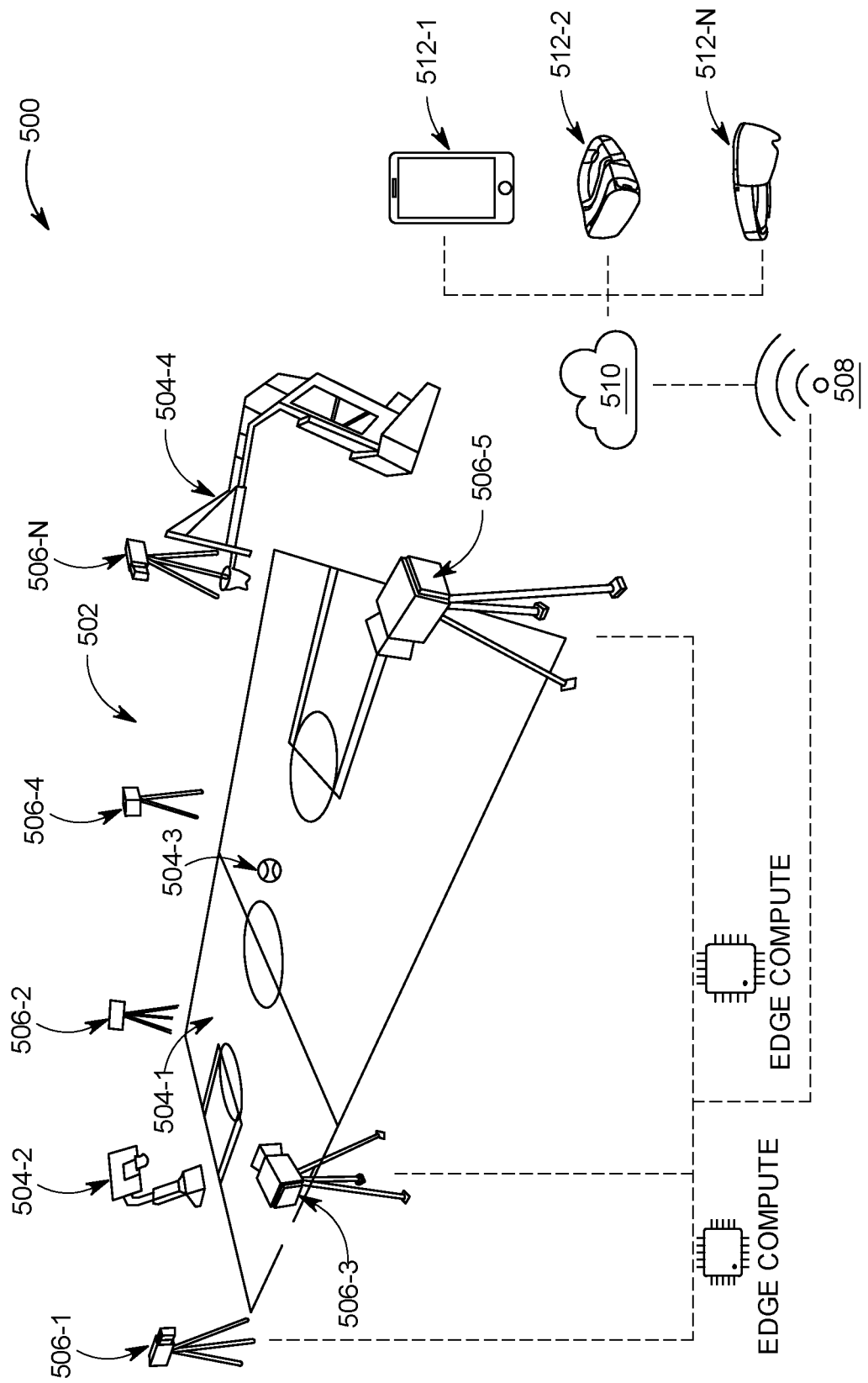
FIG. 5 depicts an example representation of a parametric capture process of a live basketball match, according to an example embodiment of the present disclosure.

FIG. 5 depicts an example representation of the parametric capture process of a basketball match. According to FIG. 5, embodiments may include a system 500 and a method for parametric capture of an event including, but not limited to a basketball match 502. The system 500 and method may include one or more video cameras 506-1 to 506-N (collectively referred to as cameras 506, herein) optimally positioned to capture the basketball match 502. In some embodiments, the cameras 506 may communicate with server 510 or cloud (also designated as 510, herein), which may be at an off-premises location. For example, the off-premises location may include a cloud service or a live stream direct to the viewer's viewing devices, such as consumer electronic devices 512-1 to 512-N (collectively referred to as electronic devices 512, herein). The cameras 506 may be in communication with server 510 of the cloud at the off-premise location via a secured network or internet 508.

The server 510 may also communicate with the electronic devices 512 associated with consumers. For example, the electronic device 512 may be an Extended Reality (XR) device, a mobile phone, a projection device, a monitor, a heads up display, an optical head-mounted display, or a television. The Extended Reality (XR) device is an Augmented Reality (AR) device, a Virtual Reality (VR) device, or a Mixed Reality (MR) device. Further, the XR device may include be selected from. mobile phone 512-1, Oculus Quest 512-2, HoloLens2 512-N, but is not limited to these device types. In some embodiments, the server 510 may include a user authentication process when communicating with the user's electronic device 512. Authentication ensures the infidel consuming the live event, for example over the internet 508, is authorized to do so. For example, a user subscription to the live stream event may only allow consumption on a single device during the original broadcast.

In other embodiments, the cameras 506 may be in communication with a local broadcast booth or on-premise server, and the on-premise server may then be in communication with off-premise servers 510 through the network or internet 508.

In embodiments in which multiple cameras 506 is used, for example, multiple cameras positioned about the basketball court 504-1, a calibration process may first be performed on one or more of the multiple cameras 506. Once the live basketball event 502 begins, a video broadcast from one or all cameras 506 may be sent to the on-premise server, which may then be sent to server 510 on the cloud. Once on cloud 510, the recorded video image data may be processed on server 510 that may run discrete element recognition algorithms. Server 510 may also be adapted to batch process the live event for consumption on different display devices, for example a television, a mobile phone, or tablet. Similarly, the server may include audio processing to render a live stream event for surround sound like Dolby Atmos™. The server may also include software for processing the stream for different streaming protocols like MPEG-DASH, Apple HTTP Live Streaming (HLS), Microsoft Smooth Streaming, Adobe HTTP Dynamic Flash Streaming (HDS).

It may be desirable to capture aspects of the live basketball event 502 prior to commencement of the live event.

Such pre-processing allows a viewer to alter the viewing angle when the event is streaming. Such pre-processesing may provide the additional information needed during the live basketball event 502 to fill in details that me be obstructed during recording. In some embodiments, the number of cameras 506, their image and sound quality, captured Frames Per Second (FPS), and image resolution can be modified to match the quality of pre-captured discrete elements or may be optimized for a broadcast-quality or a broadcast bandwidth requirement.

Once on the cloud 510, the recorded video image data may be processed on server 510. In some embodiments, server 510 runs discrete element recognition algorithms, for example identifying specific players, actions of a player such as a scoring event or defensive stop like a blocked shot. A-frame, such as a single frame from the image data of the scene recorded by the cameras 506 may include the discrete elements such as a three dimensional object, at least one participant, or the environmental aspect of the event. Such information may be combined together to provide contextual information that may be searched. For example, accurate object recognition within the context of parametric capture of the present invention combined with spatial awareness of the players may be used to identify a player completing a three-point play. Such information might be stored and queried by the user using voice recognition to request "Show me Lebron James' three-point plays." Similarly, a statistics engine may be combined with the parametric capture and semantic data to identify successful low-probability plays to identify possible "Plays of the Game." In some embodiments, the combination of such services may be offered as a premium service, or priced in addition to the streaming event, or as a premium offering of the streaming service, for example a Premium NBA TV streaming package.

With regard to the broadcasted basketball event 502, the discrete elements may include at least one participant such as a basketball player, a three dimensional object such as a basketball 504-3, and an environmental aspect of the event such as the basketball court 504-1, and baskets 504-2. As may occur in a live basketball event 502 or other live events, cameras 506 positioned about the basketball court 502-1 may capture different image data. For example, from a first perspective, the image data captured by cameras (say 506-1, 506-3, and 506-5) positioned on one side of the court 504-1, may include a basketball player, the basketball 504-3, a portion of the basketball court 504-2 and baskets 504-2. Further, in an alternative angle, the image data captured by other cameras (say 506-2, 506-4, and 506-N) positioned on the other side of the court 504-1 may include all ten basketball players, a referee, the length of the basketball court 504-1, while the view of the basketball 504-3 may be obstructed by at least one player. In some embodiments the ability to construct an obstructed view can provide important information that might not otherwise exist. Such information may be important for constructing a pivotal play under review by the on-court or off-court gaming official.

In some embodiments, the discrete elements may be associated with one or more characteristics. The server 510 may assign one or more parameters to one or more characteristics. In some embodiments, the discrete element, the one or more characteristics, and the one or more parameters constitute scene information data. For example, an object may include a basketball shoe worn by an athlete. The parameters may include the shoe model, the manufacturer, other games the shoe was worn by the player, and license information. License information of the show may include a license by the player and or manufacturer to replace the show with an alternative model in future broadcasts. Further, server 510 may use a set of multiple algorithms to extract 3D data of discrete elements such as the people and objects that appear in the image data of basketball event 502. The use of multiple algorithms to extract 3D data of discrete elements can be done either in real-time or in an offline manner (this is configured per project/product). In the case of basketball event 502 relevant data, for example, the people on the court 504-1, the ball and baskets 504-2, and their location in 3D and/or 4D space is stored. The data from the 3D or 4D proprietary format may later or contemporaneously be streamed to interested end-users (consumers) who can watch the game on their corresponding XR devices 512 in 3D space. Once the 3D data is extracted, a completed project may persist the 3D data, for example in a proprietary format for later use. In another non-limiting example, a completed project may send the 3D data in real-time to be displayed on the XR devices 512.

In one embodiment, at least one of the image data, the discrete element, the one or more characteristics, and the one or more parameters constituting the scene information data, the rendered images, and the photorealistic image associated with the basketball event 502 may be sent to the client for more pipeline and algorithm processes. Further, the final output may also be stored in memory in a proprietary format.

In some embodiments, a Mocap for XR system may provide a service to capture the motion of people and objects in 3D space, in real-time. The system is comprised of both hardware for capture, storing, processing, and viewing as well as software components for identifying objects within image data, compressing image data, and encrypting image data. Prospective clients may consume a Mocap system's output via an application programming interface (API). Data captured, such as individual players, objects, or metada, may be provided via an SDK. In an exemplary adaptation of the present invention, such information may be included for use in video games, such as the NBA 2K™.

In one embodiment, parametric capture may be used for Warfare/Military training/simulation applications. In such an embodiment, companies or government agencies may provide technological training facilities for warfare. Mocap for XR may enhance these systems significantly by exposing to a warfare simulator the position of the soldiers and objects within the training space. In turn, the warfare simulation developers can enhance the features of their applications with the data produced by the Mocap for XR system.

In another embodiment, parametric capture may be used in VR compounds. In such an embodiment VR compounds are used for several reasons, including entertainment. Spaces within VR compounds may make use of markers to detect the location of objects and anatomical markers of participants in the space, such as a skeleton or minutia such as a human joint. Mocap for XR may enhance these experiences by detecting people's skeletons in real-time without the need for markers, reducing the required time to set up users to enjoy these experiences.

In another embodiment, parametric capture may be used in Academic research. In such an embodiment, research on the movement of people within a given space under a variety of conditions may be examined. For example, research of the way people use certain detectable 3D objects within the space in which the system is installed may be better understood. In some embodiments, for example, the research of how crowds behave in an environment may be used to inform the architectural design of a building.

In a preferred embodiment for Mocap for XR system, the setup Mocap system may begin by scanning a single room or space. Scanning may occur with between four and eight motion capture devices, such as still or video cameras. The scanning system may be augmented with a server containing two powerful Graphics Processing Units (GPU). Server memory may be loaded with software for capturing and identifying objects within image data.

In another embodiment, parametric capture may be used in Mocap for Animation. The Mocap for Animation may be used in a service that captures motion, for example, the motion of people and objects, into known 3D animation formats (e.g. FBX). This system may be deployed in real-time, with great accuracy as the system is markerless (requires no markers) and is more affordable than specialized systems. Mocap for Animation can save time and costs for animation studios by automating processes that are either manual or require access to equipment that is cost-prohibitive.

Figure 6:
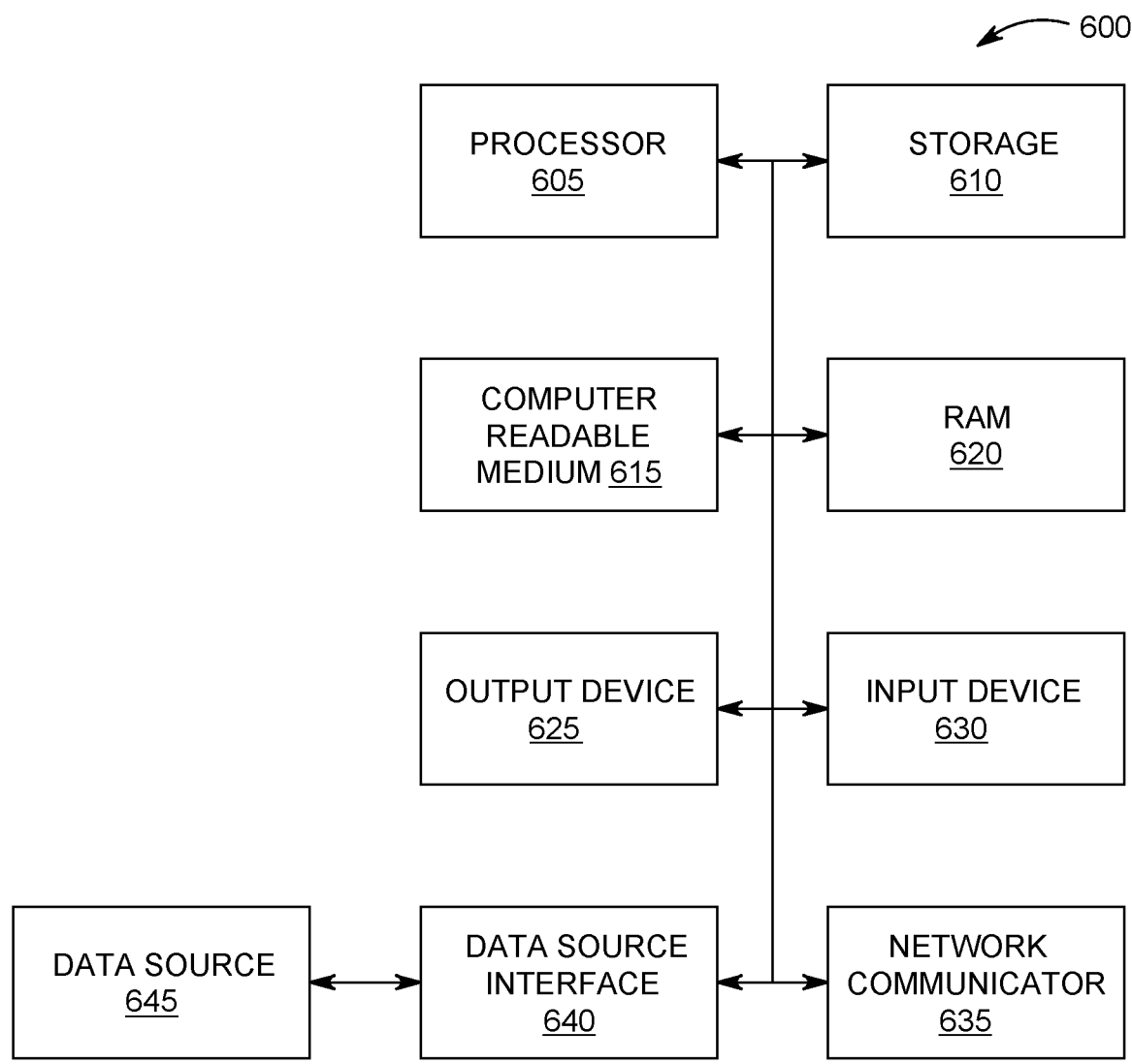
FIG. 6 illustrates a hardware platform for the implementation of parametric capture of live streaming event, according to an example embodiment of the present disclosure

FIG. 6 illustrates a hardware platform for the implementation of the parametric capture of live streaming events, according to an example embodiment of the present disclosure.

Referring now to FIG. 6, the hardware platform 600 may be a computer system 600 or may represent a computational platform that includes components that may be ran on a server or another computer system. The computer system 600 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 600 may include a processor 605 that executes software instructions or code stored on a non-transitory computer-readable storage medium 610 to perform methods of the present disclosure. The software code includes, for example, instructions to gather information pertaining cyber anomalies and data elements in a vehicular computing environment and generate alerts, based on risk assessment of the vehicular computing environment.

The instructions on the computer-readable storage medium 610 are read and stored the instructions in storage 615 or in random access memory (RAM) 620. The storage 615 provides a large space for keeping static data where at least some instructions could be stored for later execution. The stored instructions may be further compiled to generate other representations of the instructions and dynamically stored in the RAM 620. The processor 605 reads instructions from the RAM 620 and performs actions as instructed.

The computer system 600 further includes an output device 625 to provide at least some of the results of the execution as output including, but not limited to, visual information to users, such as external agents. The output device can include a display on computing devices and VR glasses, XR devices, AR devices, or may be an interactive dashboard. For example, the display can be a mobile phone screen or a laptop screen. GUIs and/or text are presented as an output on the display screen. The computer system 600 further includes input device 630 to provide a user or another device with mechanisms for entering data and/or otherwise interact with the computer system 800. The input device may include, for example, a keyboard, a keypad, a mouse, or a touchscreen. In an example, the output of any of the attached generator, the data lake, the machine learning engine may be displayed on the output device 625. Each of these output devices 625 and input devices 630 could be joined by one or more additional peripherals. In an example, the output device 625 may be used to provide alerts or display a risk assessment map of the environment.

A network communicator 635 may be provided to connect the computer system 800 to a network and in turn to other devices connected to the network including other clients, servers, data stores, and interfaces, for instance. A network communicator 635 may include, for example, a network adapter such as a LAN adapter or a wireless adapter. The computer system 600 includes a data source interface 640 to access data source 645. A data source is an information resource. As an example, a database of exceptions and rules may be a data source. Moreover, knowledge repositories and curated data may be other examples of data sources.

Those skilled in the art will appreciate that the foregoing specific exemplary system and/or methods and/or technologies are representative of more general methods and/or systems and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency tradeoffs (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a main software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar modes of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms and that an illustrative embodiment of the subject matter described herein applies regardless of the particular type of signal bearing medium used to actually carry out the distribution. Examples of a signal bearing medium include, but are not limited to, the following: a recordable type medium such as a USB drive, a solid state memory device, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data processing system. Those having ordinary skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude the use of the system in another territory.

All of the above U.S. patents, U.S. patent application publications, U.S. patent applications, foreign patents, foreign patent applications, and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, the use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of parametric capture of an event comprising:
   a. capturing discrete elements, wherein the discrete elements comprise at least one participant, a three dimensional object, and an environmental aspect of the event;
   b. filming a live event to create image data from a scene, wherein a frame of the image data from the scene comprises a discrete element, wherein the discrete element includes at least one of the three dimensional object, at least one participant, or the environmental aspect of the event;
   c. receiving the image data of the scene;
   d. identifying at least one discrete element within the image data from the scene, wherein the discrete element is associated with one or more characteristics;
   e. assigning one or more parameters to the one or more characteristics, wherein the discrete element, the one or more characteristics, and the one or more parameters constitute scene information data;
   f. triangulating the scene information data to construct a three dimensional representation of each discrete element within the image data from the scene;
   g. processing the image data from the scene to construct a two dimensional surface representation for each discrete element within the image data from the scene;
   h. integrating the three dimensional representation and the two dimensional representation for each discrete element; and
   i. rendering an image of the scene based on integrated three dimensional and two dimensional representations for each discrete element within the image data from the scene.

2. The method of claim 1 wherein the live event comprises a live stream event, a sports event, a concerts, a lectures, a one to one training, or a one to many training, a holographic communication, an augmented reality event, or a virtual reality event.

3. The method of claim 1, further comprising sending the rendered image of the scene to a consumer electronic device.

4. The method of claim 3, wherein the consumer electronic device is an Extended Reality (XR) device, a mobile phone, a projection device, a monitor, a heads up display, an optical head-mounted display, or a television.

5. A method for performing parametric capturing and streaming of a scene over time, the method comprising:
   receiving image data of a scene;
   identifying a discrete element within the image data from the scene, wherein the discrete element is associated with one or more characteristics;
   assigning one or more parameters to the one or more characteristics, wherein the discrete element, the one or more characteristics, and the one or more parameters constitute scene information data;
   triangulating the scene information data to construct a three dimensional representation of each discrete element within the image data from the scene;
   processing the image data from the scene to construct a two dimensional surface representation for each discrete element within the image data from the scene;
   integrating the three dimensional representation and the two dimensional representation for each discrete element; and
   rendering an image of the scene based on integrated three dimensional and two dimensional representations for each discrete element within the image data from the scene.

6. The method of claim 5, wherein the receiving image data of a scene comprises receiving recorded video data of a scene.

7. The method of claim 5, wherein the receiving image data of a scene comprises receiving real-time streaming video data of a scene.

8. The method of claim 5, wherein the scene comprises a performance event including one or more of a sporting event, a promotional event, or a cultural event.

9. The method of claim 5, wherein the at least one three dimensional object present in the scene comprises one or more of a sporting equipment article, an item of event equipment, a scene participant, an environmental element, or a scene member.

10. The method of claim 9, wherein the scene participant comprises at least one of a player, a judge, a referee, an actor, or a commentator.

11. The method of claim 5, wherein the one or more characteristics comprises at least one of light reflective property data, movement data, object deformation data, body posture data, facial expression data, color data, normal data, tangent data, depth data, or resolution data.

12. The method of claim 5, wherein the assigning one or more parameters to the one or more characteristics comprises:
   assigning three dimensional coordinates to an object in the scene to estimate a spatial position of the object in the scene.

13. The method of claim 5, wherein the one or more parameters comprises:
   at least one of shape, a scale, a sheer, color, texture, position in space, orientation in space, directional velocity, or rotational velocity.

14. The method of claim 5, wherein the one or more parameters comprises:
   at least one of body posture, body position, body orientation, body proportion, individual identity, muscle deformation, facial expression, facial color, facial texture, finger posture, or hand posture.

15. The method of claim 5, wherein the one or more parameters is determined using a supervised learning algorithm, a deep neural network, or a machine learning algorithm.

16. The method of claim 5, wherein the triangulating the scene information data to construct a three dimensional representation of each discrete element within the image data from the scene comprises:
   constructing a spatial and temporal coherent parametric representation of the scene based on 2D and 3D parameters assigned to one or more characteristics of one or more discrete elements.

17. The method of claim 5, wherein the processing the image data from the scene to construct a two dimensional surface representation for each discrete element within the image data from the scene comprises:
   processing texture data from a time series of images to construct a two dimensional surface representation for each discrete element within the image data from the scene.

18. The method of claim 5, wherein the rendering an image of the scene based on integrated three dimensional and two dimensional representations for each discrete element within the image data from the scene comprises:
   performing one or more 3D manipulations on the integrated three dimensional and two dimensional representations for each discrete element using at least one of a physics simulation algorithm or an anatomically correct body deformation algorithm.

19. The method of claim 5, wherein the rendering an image of the scene based on integrated three dimensional and two dimensional representations for each discrete element within the image data from the scene comprises:
   transferring a rendered image of the scene to a supervised learning algorithm, wherein the supervised learning algorithm re-renders the rendered image into a photo-realistic image.

20. The method of claim 19, wherein the supervised learning algorithm comprises at least one of a Deep Neural Network (DNN), a Convolutional Neural Network (CNN), or a Generative Adversarial Network (GAN).

* * * * *